Patented Aug. 10, 1937

2,089,435

UNITED STATES PATENT OFFICE 2,089,435

VAT DYESTUFFS OF THE ANTHRAQUINONE SERIES

Heinz Scheyer, Frankfort-on-the-Main, and Emil Schwamberger, Frankfort-on-the-Main-Fechenheim, Germany, assignors to General Aniline Works, Inc., New York, N. Y., a corporation of Delaware No Drawing. Application June 28, 1935, Serial No. 28,978. In Germany July 4, 1934

4 Claims. (Cl. 260—61)

Our present invention relates to new vat dyestuffs of the anthraquinone series more particularly to dyestuffs of the general formula:

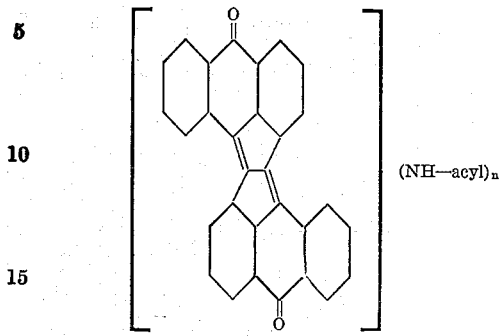

(NH—acyl)$_n$ wherein $n$ is the number 1 or 2 and acyl stands for instance for the acetyl, benzoyl, substituted benzoyl, diphenyl-4-carboxylic acid, anthraquinone-2-carboxylic acid, pyrazolanthrone-2-carboxylic acid radicle, which dyestuffs dye the vegetable fiber from the vat mostly strong brownish shades of a good fastness.

The new dyestuffs are obtainable as follows: When treating the "glyoxal-dianthraquinone compounds" obtainable according to U. S. Patent No. 1,646,782 with an acid condensing agent either of the aluminium halide group or of the sulfuric acid group with or without the addition of an oxidant according to U. S. Patent 1,990,841 products are obtained corresponding to the above formula without an acylaminogroup, being the starting material for the manufacture of the present new dyestuffs.

So far as these initial products do not contain aminogroups one or two aminogroups can be introduced for instance by nitration whereby according to the quantity of the nitrating agent used homogenous mono- and dinitro products are formed, which can be converted by reduction into the corresponding mono- and diaminocompounds. Such amino compounds may be obtained moreover for instance by converting halogenated initial products into the corresponding amino compounds by reaction with para-toluenesulfamide and saponification of the formed condensation products.

The acylation of these aminocompounds may be preferably carried out by means of the acid chlorides, but likewise by means of the acid anhydrides or esters, advantageously in the presence of a suitable diluent.

In order to further illustrate our invention the following examples are given; but we wish it, however, to be understood that our invention is not limited to the particular products or reaction conditions stated therein.

Example 1

75 parts of the condensation product obtained by acting with for instance a mixture of aluminium chloride, sodium chloride and manganese dioxide on the condensation product derived from anthrone and glyoxalsulfate (cf. Example 1 of U. S. Patent 1,990,841) are suspended in about 1500 parts of nitrobenzene and while stirring at about 100° C. 15 parts of a nitric acid of 94% strength are added, whereby after a short time the formed nitro compound separates. When isolated it forms reddish brown crystals and is converted into the amino-compound by treatment with an alkaline hydrosulfite solution. The formed amine, which has been partly dissolved in the form of its leucocompound, may be isolated by blowing air into the vat. The new monoamino-compound thus formed crystallizes from highly boiling solvents as brownish black needles dissolving in concentrated sulfuric acid with a dichroic purple and bluish violet color.

10 parts of this monoamine are suspended in about 100 parts of nitrobenzene, 10 parts of benzoylchloride are added and the mixture is heated for about an hour at about 170° C. while stirring. The formed acylderivative of the formula:

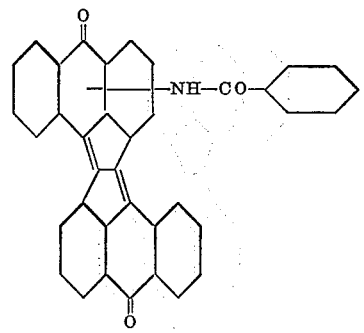

is filtered off, washed out with chlorobenzene and alcohol and dried. It represents a dark brown crystalline powder, soluble in concentrated sulfuric acid with a bluish violet color and dyeing cotton from a reddish vat reddish brown shades of a good fastness.

When acting on the amino-compound with ortho-chloro- or para-methoxybenzoylchloride or diphenyl-4-carboxylic acid chloride likewise fast brown dyestuffs are obtained.

Example 2

10 parts of the amino-compound used as starting material in Example 1 are mixed with about 250 parts of nitrobenzene and 50 parts of acetic acid anhydride and the mixture is heated for about 2 hours at about 170° C. while stirring. The formed acetylamino compound is filtered off, washed out with alcohol and dried. It is a brown crystalline powder soluble in sulfuric acid with a bluish violet color and dyeing cotton brown shades from a brownish red vat.

Example 3

10 parts of the amino-compound used as a starting material in the foregoing examples are mixed with about 200 parts of nitrobenzene and 7.3 parts of anthraquinone-2-carboxylic acid chloride and the mixture is heated while stirring for some time at about 180° C. The formed condensation product of the formula:

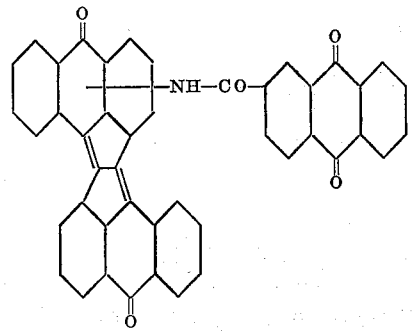

is filtered off, washed out with chlorobenzene and alcohol and dried. It is a reddish brown crystalline powder soluble in sulfuric acid with a violet color and dyeing cotton from the brownish violet vat strong reddish brown shades of a good fastness.

When condensing with 1-amino-anthraquinone-2-carboxylic acid chloride (or with 1-nitroanthraquinone-2-carboxylic acid and subsequent reduction) a likewise reddish brown dyestuff is obtained, when condensing with pyrazolanthrone-2-carboxylic acid chloride the formed dyestuff dyes yellowish brown shades.

Example 4

10 parts of the condensation product of the formula:

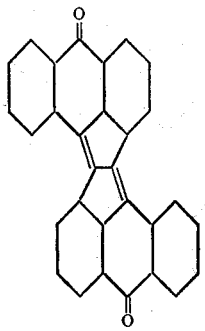

(cf. Example 1 of U. S. Patent 1,990,841) are dissolved in about 200 parts of concentrated sulfuric acid and at 0° C. 3.6 parts of a nitric acid of 94% strength are dropped in. The reaction mass is poured on ice, the separated reddish brown nitrocompound is filtered off, washed out. By warming it with an alkaline hydrosulfite or sodium sulfide solution it is reduced, the formed leuco compound may be isolated by blowing in air. The formed reaction product is a diamine according to analysis. The new diamino compound crystallizes from nitrobenzene as dark greenish needles dissolving in sulfuric acid with a dichroic purple and greenish blue color.

10 parts of this diaminocompound are mixed with about 200 parts of nitrobenzene and 20 parts of benzoylchloride and the mixture is heated at about 170° C. for about 1 to 2 hours. The formed condensation product which separates as fine crystals is filtered off while warm, washed out with chlorobenzene and alcohol and dried. It is a blackish brown powder soluble in concentrated sulfuric acid with a reddish violet color and dyeing cotton from a purplish vat yellowish brown fast shades.

Similar dyestuffs are obtained when using as acylating agent substituted benzoylchlorides.

When condensing with anthraquinone-2-carboxylic acid chloride the formed dyestuff of the formula:

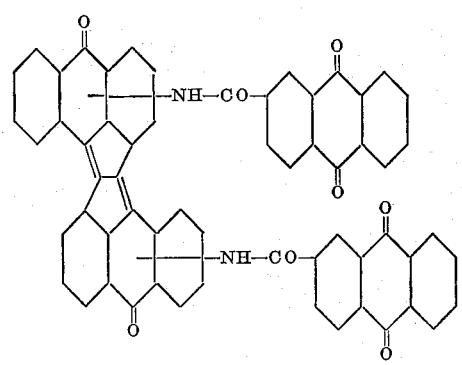

dyes cotton brown shades of a good fastness.

Example 5

The brown condensation product obtained by subjecting the condensation product derived from 1-chloroanthrone and glyoxal to the action of an alcoholic caustic potash solution and subsequently to an aluminium chloride melt (cf. U. S. Patent 1,990,841) is decomposed with para-toluene-sulfamide in the presence of potash, copper acetate and nitrobenzene and the formed condensation product is saponified by gently warming it in a concentrated sulfuric acid solution.

10 parts of the diaminocompound thus formed are condensed with 20 parts of para-methoxybenzoylchloride with the addition of about 500 parts of trichlorobenzene. The formed condensation product of the probable formula:

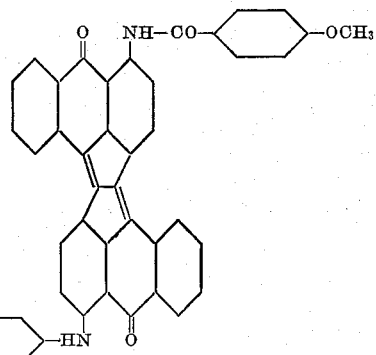

is a brown powder, soluble in concentrated sulfuric acid with a violet color and dyeing cotton fast yellowish brown shades from a purplish vat.

Example 6

10 parts of the condensation product containing two halogen atoms, obtained by subjecting the condensation product derived from 2-chloroanthrone and glyoxal to a treatment with a mixture of aluminium chloride, sodium chloride and manganese dioxide, cf. Example 3 of U. S. Patent 1,990,841, are mixed with about 100 parts of dichlorobenzene and 5.4 parts of nitric acid of 1.51 density and the mixture is stirred at about 100° C. for about 4 hours. The formed nitroproduct is converted into the aminocompound as described above and the isolated amino-compound is condensed with the tenfold quantity of benzoylchloride. The formed dyestuff which contains halogen as well as the benzoylaminogroup dyes cotton from a red vat yellowish brown shades of a good fastness.

We claim:

1. Vat dyestuffs of the anthraquinone series of the general formula:

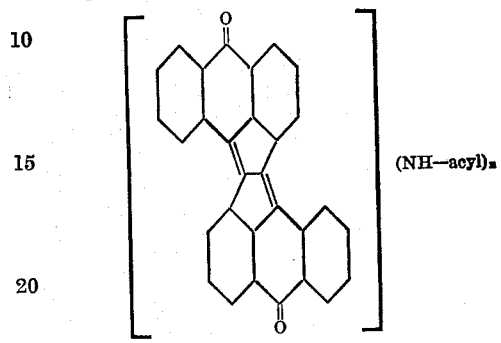

wherein $n$ is the number 1 or 2 and acyl stands for a member of the group consisting of the acetyl, benzoyl, benzoyl containing a member of the group consisting of chlorine and a methoxy group, diphenyl-4-carboxylic acid, anthraquinone-2-carboxylic acid, pyrazolanthrone-2-carboxylic acid radicles, which dyestuffs dye the vegetable fiber from the vat mostly strong brownish shades of a good fastness.

2. A vat dyestuff of the anthraquinone series of the formula:

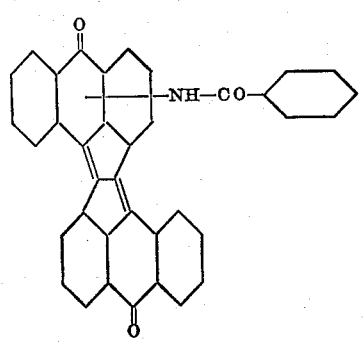

which dyestuff represents a dark brown crystalline powder, soluble in concentrated sulfuric acid with a bluish violet color and dyeing cotton from a reddish vat reddish brown shades of a good fastness.

3. A vat dyestuff of the anthraquinone series of the formula:

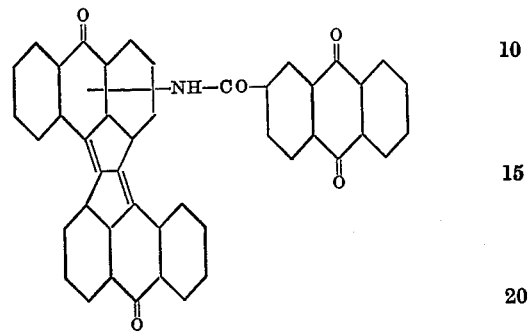

which dyestuff is a reddish brown crystalline powder soluble in sulfuric acid with a violet color and dyeing cotton from the brownish violet vat strong reddish brown shades of a good fastness.

4. A vat dyestuff of the anthraquinone series of the formula:

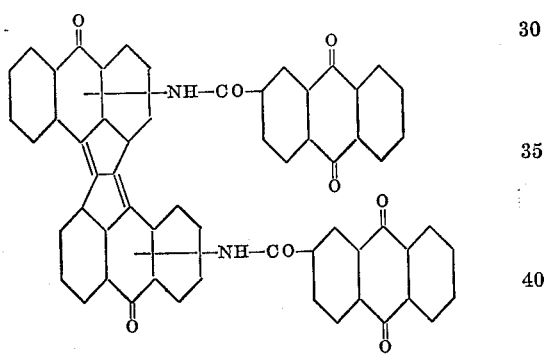

which dyestuff dyes cotton brown shades of a good fastness.

HEINZ SCHEYER.
EMIL SCHWAMBERGER.